United States Patent
Harada et al.

(10) Patent No.: US 9,826,462 B2
(45) Date of Patent: Nov. 21, 2017

(54) USER TERMINAL, RADIO BASE STATION AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/032,692

(22) PCT Filed: Oct. 22, 2014

(86) PCT No.: PCT/JP2014/078091
§ 371 (c)(1),
(2) Date: Apr. 28, 2016

(87) PCT Pub. No.: WO2015/064442
PCT Pub. Date: May 7, 2015

(65) Prior Publication Data
US 2016/0255569 A1    Sep. 1, 2016

(30) Foreign Application Priority Data

Oct. 31, 2013  (JP) ................................ 2013-226300
May 7, 2014    (JP) ................................ 2014-096046

(51) Int. Cl.
*H04W 48/08*    (2009.01)
*H04W 8/00*     (2009.01)
(Continued)

(52) U.S. Cl.
CPC ......... *H04W 48/08* (2013.01); *H04W 72/044* (2013.01); *H04W 72/0426* (2013.01);
(Continued)

(58) Field of Classification Search
CPC .............. H04W 48/08; H04W 72/042; H04W 72/0426; H04W 72/044; H04W 72/04; H04W 92/18; H04W 8/005
See application file for complete search history.

(56) References Cited

U.S. PATENT DOCUMENTS

2015/0085818 A1*   3/2015   Huang ................. H04L 5/0037
                                                           370/330
2016/0014774 A1    1/2016   Seo

FOREIGN PATENT DOCUMENTS

EP          2983308 A1     2/2016

OTHER PUBLICATIONS

International Search Report issued in PCT/JP2014/078091 dated on Nov. 18, 2014 (2 pages).
(Continued)

*Primary Examiner* — Chuong A Ngo
(74) *Attorney, Agent, or Firm* — Osha Liang LLP

(57) ABSTRACT

The present invention is designed so that adequate mutual detection is made possible in non-collision-type D2D discovery during inter-terminal direct communication. A user terminal can execute inter-terminal direct communication, and has a receiving section that receives initial allocation location information of a resource for transmitting a discovery signal for use in inter-terminal direct communication, and a control section that switches the location of the resource to transmit the discovery signal, per period, in accordance with a pre-rule.

8 Claims, 18 Drawing Sheets

(51) Int. Cl.
    *H04W 72/04*    (2009.01)
    *H04W 92/18*    (2009.01)
(52) U.S. Cl.
    CPC .......... *H04W 8/005* (2013.01); *H04W 72/042* (2013.01); *H04W 92/18* (2013.01)

(56) References Cited

OTHER PUBLICATIONS

Written Opinion of the International Searching Authority issued in PCT/JP2014/078091 dated Nov. 18, 2014 (4 pages).
Asustek; "Method of resource allocation for D2D discovery"; 3GPP TSG RAN WG1 Meeting #74bis, R1-134638; Guangzhou, China; Oct. 7-11, 2013 (9 pages).
Intel Corporation; "On Resource Allocation and System Operation for D2D Discovery"; 3GPP TSG RAN WG1 Meeting #74bis, R1-134141; Guangzhou, China; Oct. 7-11, 2013 (10 pages).
NTT Docomo, Inc.; "Views on D2D discovery resource allocation"; 3GPP TSG RAN WG1 Meeting #75, R1-135522; San Francisco, USA; Nov. 11-15, 2013 (4 pages).
Balazs Bertenyi; "Key drivers for LTE success; Services Evolution;"; 3GPP TSG SA; Sep. 6, 2011 (15 pages).
Office Action issued in corresponding Japanese Application No. 2014-096046, dated Apr. 19, 2016 (5 pages).
Extended European Search Report issued in the counterpart European Patent Application No. 14857534.3, dated May 26, 2017 (10 pages).

\* cited by examiner

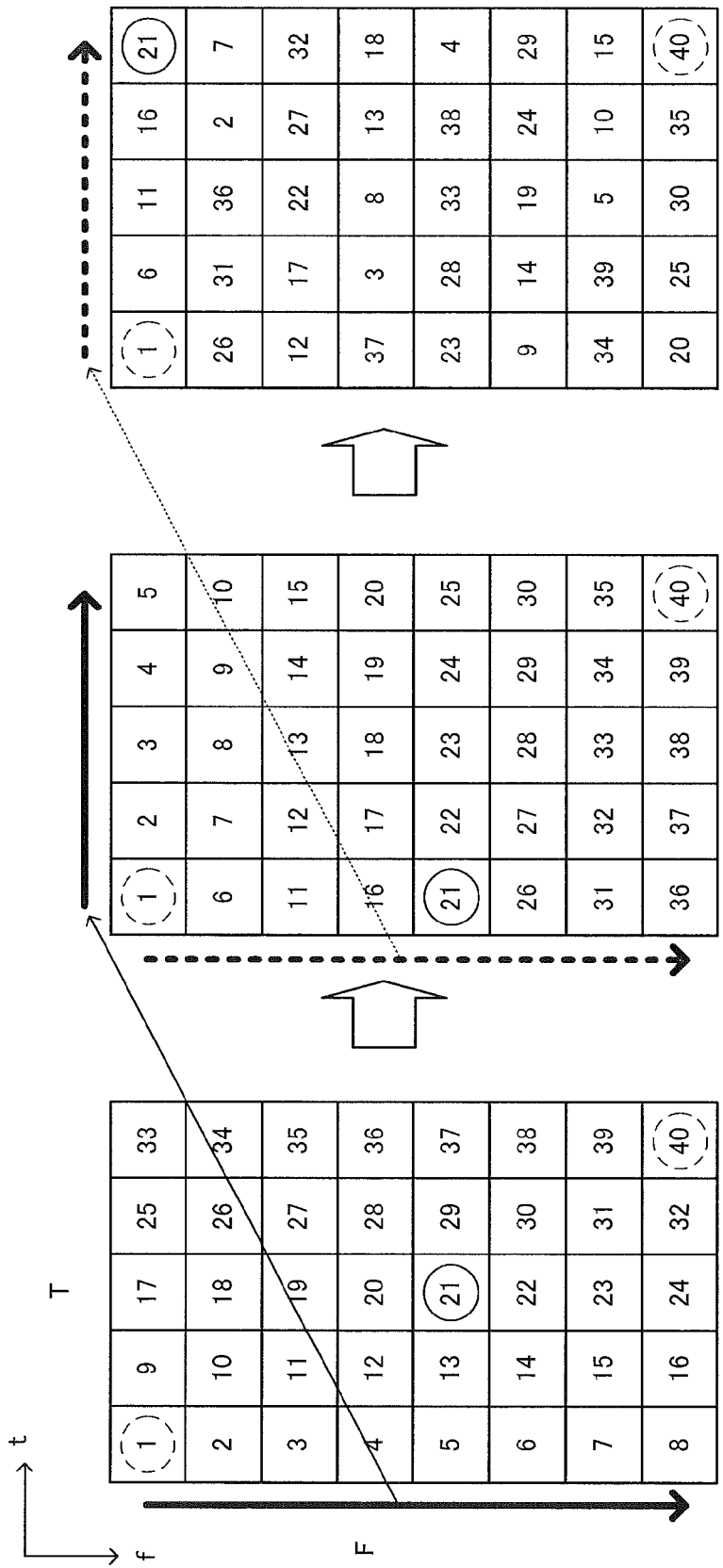

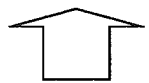
FIG.14C
FIG.14B
FIG.14A

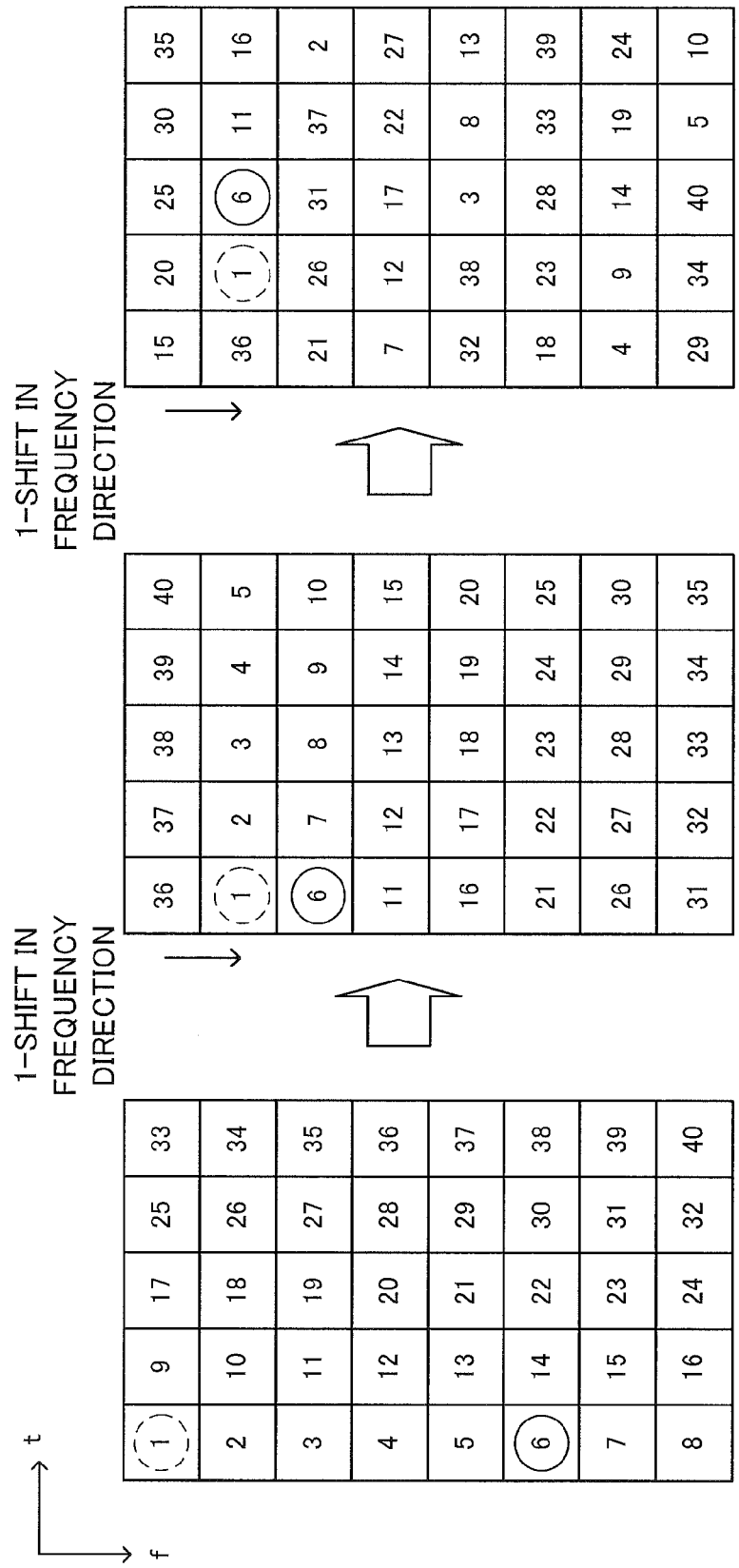

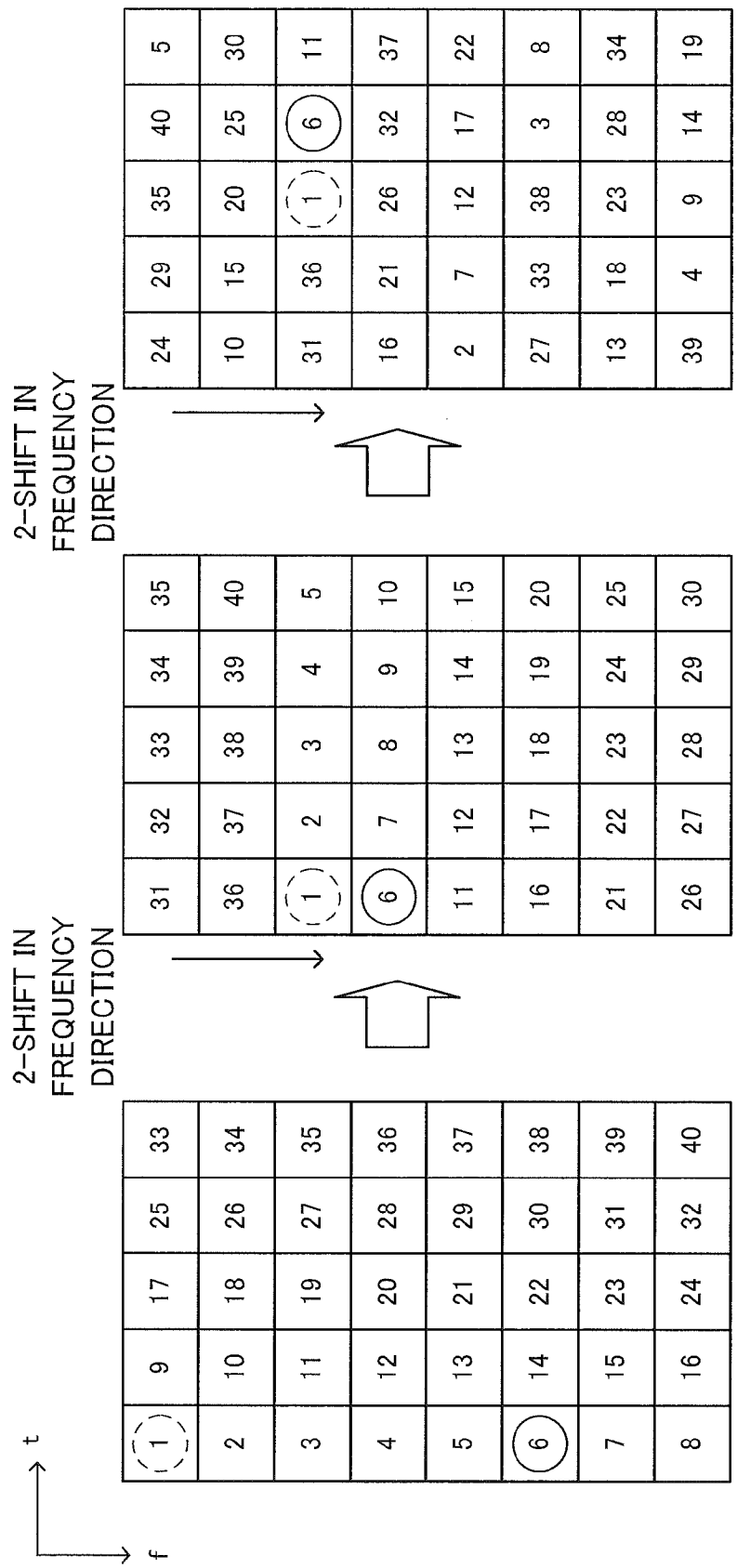

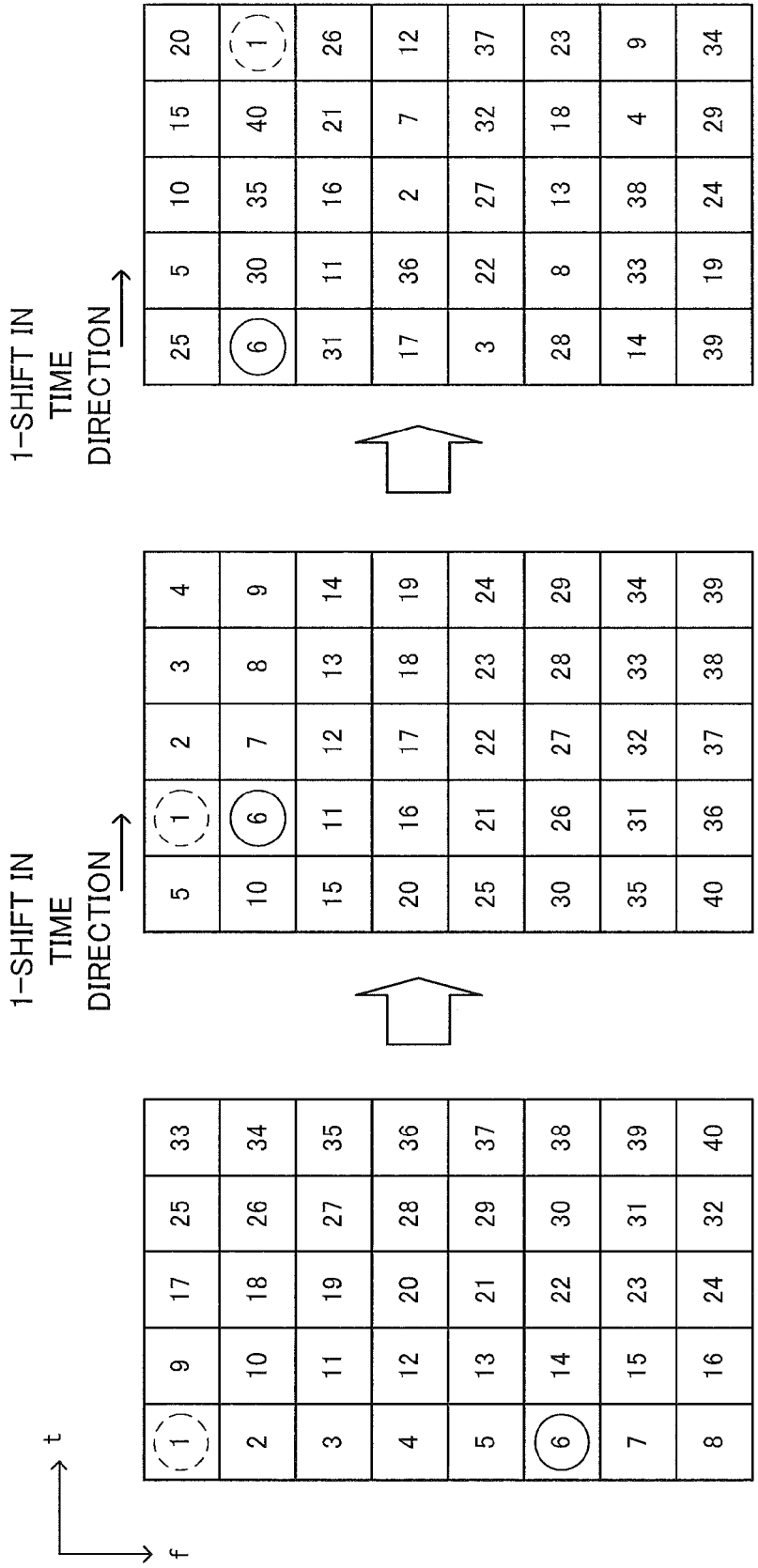

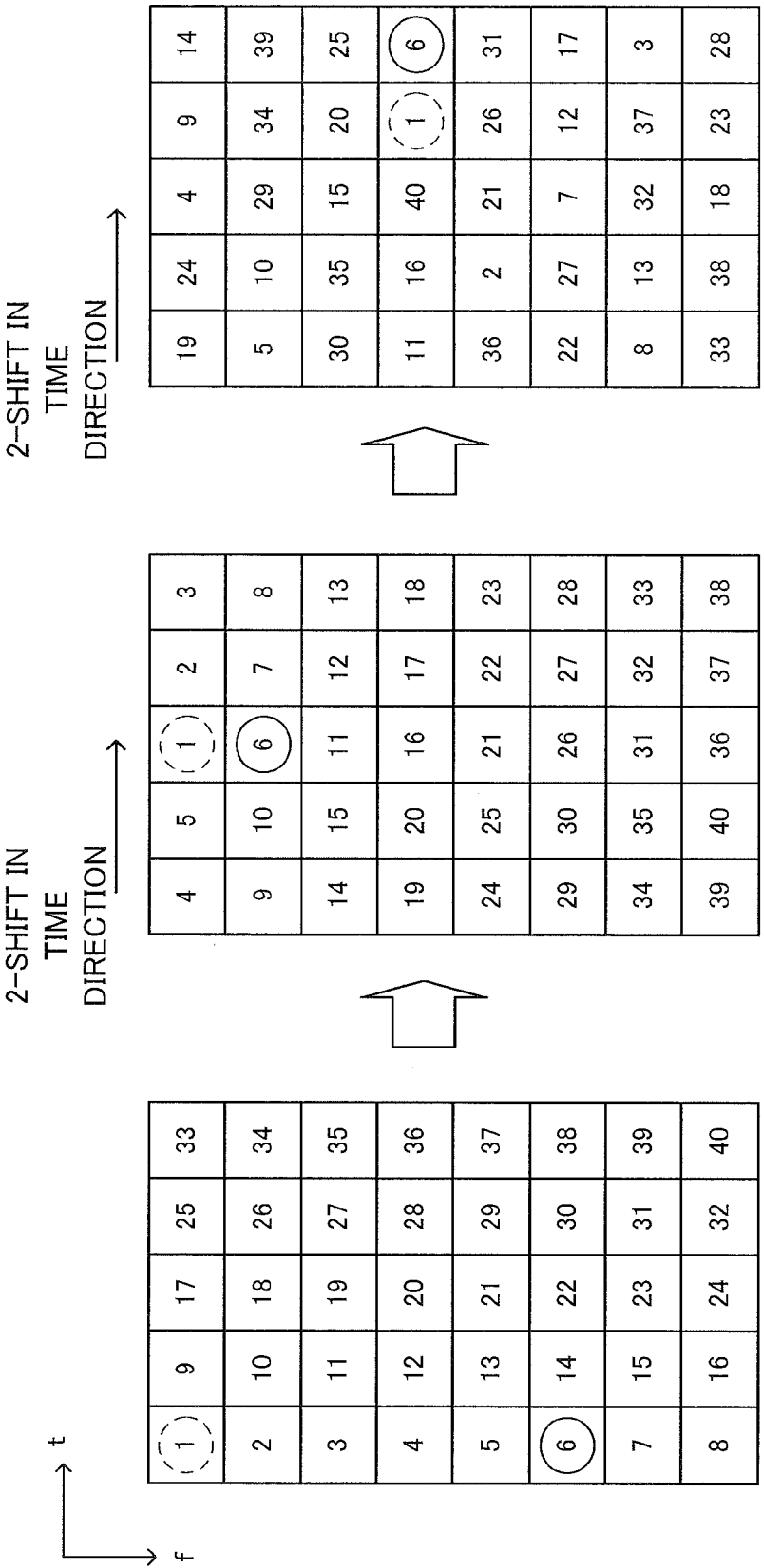

USER TERMINAL, RADIO BASE STATION AND RADIO COMMUNICATION METHOD

TECHNICAL FIELD

The present invention relates to a user terminal, a radio base station and a radio communication method in a next-generation mobile communication system.

BACKGROUND ART

In LTE (Long Term Evolution) and successor systems of LTE (referred to as, for example, "LTE-advanced," "FRA (Future Radio Access)," "4G," etc.), D2D (Device to Device) technology is under study, whereby user terminals can communicate with each other directly, without involving radio base stations (see, (for example, non-patent literature 1).

In inter-terminal direct communication (D2D communication), user terminals carry out D2D discovery to find other user terminals that are communicable. In D2D discovery, the network allocates periodic uplink resource groups as D2D discovery resources, semi-statically. The user terminals allocate discovery signals to D2D discovery resources and transmit them. Also, the user terminals find other communicable user terminals by receiving discovery signals transmitted from other user terminals.

CITATION LIST

Non-Patent Literature

Non-Patent Literature 1: "Key Drivers for LTE Success: Services Evolution," September, 2011, 3GPP, Internet URL: http://www.3gpp.org/ftp/Information/presentations/presentations_2011/2011_09_LTE_Asia/2011_LTE-Asia_3GPP_Service_evolution.pdf

SUMMARY OF INVENTION

Technical Problem

In D2D discovery, type 1 (collision-type) discovery and type 2 (non-collision-type) discovery are under study, depending on the method of specifying resources for transmitting discovery signals. There is a problem, with type 2 (non-collision-type) discovery, that user terminals that are allocated discovery signals at the same time, cannot detect each other.

The present invention has been made in view of the above, and it is therefore an object of the present invention to provide a user terminal, a radio base station and a radio communication method to allow adequate mutual detection in non-collision-type D2D discovery for inter-terminal direct communication.

Solution to Problem

The user terminal of the present invention provides a user terminal that can execute inter-terminal direct communication, and this user terminal has a receiving section that receives initial allocation location information of a resource for transmitting a discovery signal for use in inter-terminal direct communication, and a control section that switches the location of the resource to transmit the discovery signal, per period, in accordance with a pre-rule.

Advantageous Effects of Invention

According to the present invention, user terminals can detect each other properly in non-collision-type D2D discovery during inter-terminal direct communication.

BRIEF DESCRIPTION OF DRAWINGS

FIG. 5 provides diagrams to show an example of applying a pre-rule of switching the order of the time direction and the frequency direction in resource allocation, according to the second example;

FIG. 14 provides diagrams to show 0-shift resource allocation, according to the fifth example;

FIG. 15 provides diagrams to show resource allocation where 1-shifts in the frequency direction are applied, according to the fifth example;

FIG. 16 provides diagrams to show resource allocation where 2-shifts in the frequency direction are applied, according to the fifth example;

FIG. 17 provides diagrams to show resource allocation where 1-shifts in the time direction are applied, according to the fifth example; and FIG. 18 provides diagrams to show resource allocation where 2-shifts in the time direction are applied, according to the fifth example.

DESCRIPTION OF EMBODIMENTS

Figure 1:
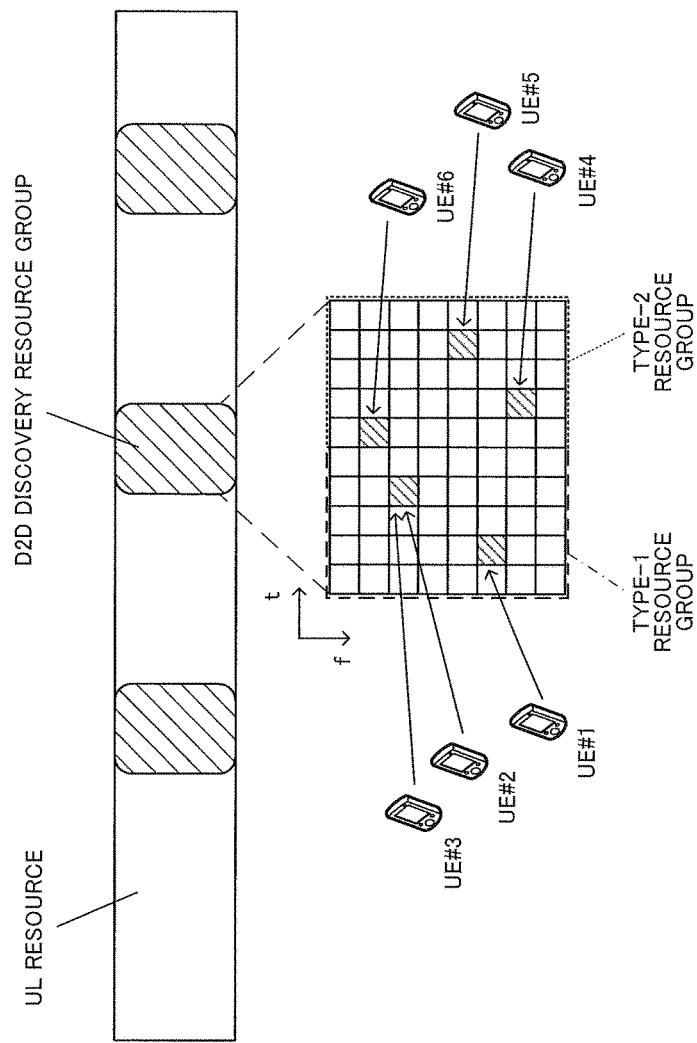
FIG. 1 is a conceptual diagram of D2D discovery resources.

Now, an embodiment of the present invention will be described below in detail with reference to the accompanying drawings. FIG. 1 is a conceptual diagram of D2D discovery resources. As shown in FIG. 1, a periodic uplink (UL) resource group is allocated, semi-statically, as a D2D discovery resource group. In one period of allocation, D2D discovery resources are divided into time-frequency resources. Individual resource blocks that neighbor each other in two-dimensional directions, namely in the frequency direction and the time direction, are formed with, for example, PRB (Physical Resource Block) pairs.

As shown in FIG. 1, D2D discovery resources are formed by including a type 1 resource group and a type 2 resource group. The type 1 resource group and the type 2 resource group are orthogonal to each other.

In type 1 discovery, the network reports the resource group (the type 1 resource group in FIG. 1) that can transmit discovery signals, to user terminals, and, from this, each user terminal randomly determines the transmission resource for the subject terminal. In type 1 discovery, each user terminal selects the transmission resource randomly, and therefore there is a threat that transmission resources collide between user terminals. Consequently, type 1 discovery is also referred to as "collision-type." For example, in FIG. 1, there is a collision of transmission resource between user terminals UE #2 and UE #3.

In type 2 discovery, the network reports resources for transmitting discovery signals, which are selected from the type 2 resource group, on a per user terminal basis, and each user terminal transmits the discovery signal in the specified transmission resource. In type 2 discovery, the network specifies the transmission resource for use by each user terminal, so that there is no collision of transmission resource between user terminals. Consequently, type 2 discovery is also referred to as "non-collision-type."

In type 2 discovery, the network needs to report separate transmission resources to each user terminal, and therefore only user terminals that are in network-connected-mode can be supported. User terminals to execute type 2 discovery will be hereinafter also referred to as "type 2 UEs."

A user terminal carries out transmission and receipt in one uplink frequency, and therefore is subject to the limitation of half duplex of being unable to receive while transmission is in progress. Consequently, when transmission resources for discovery signals are allocated at the same time, type 2 UEs cannot detect each other.

Figure 2:
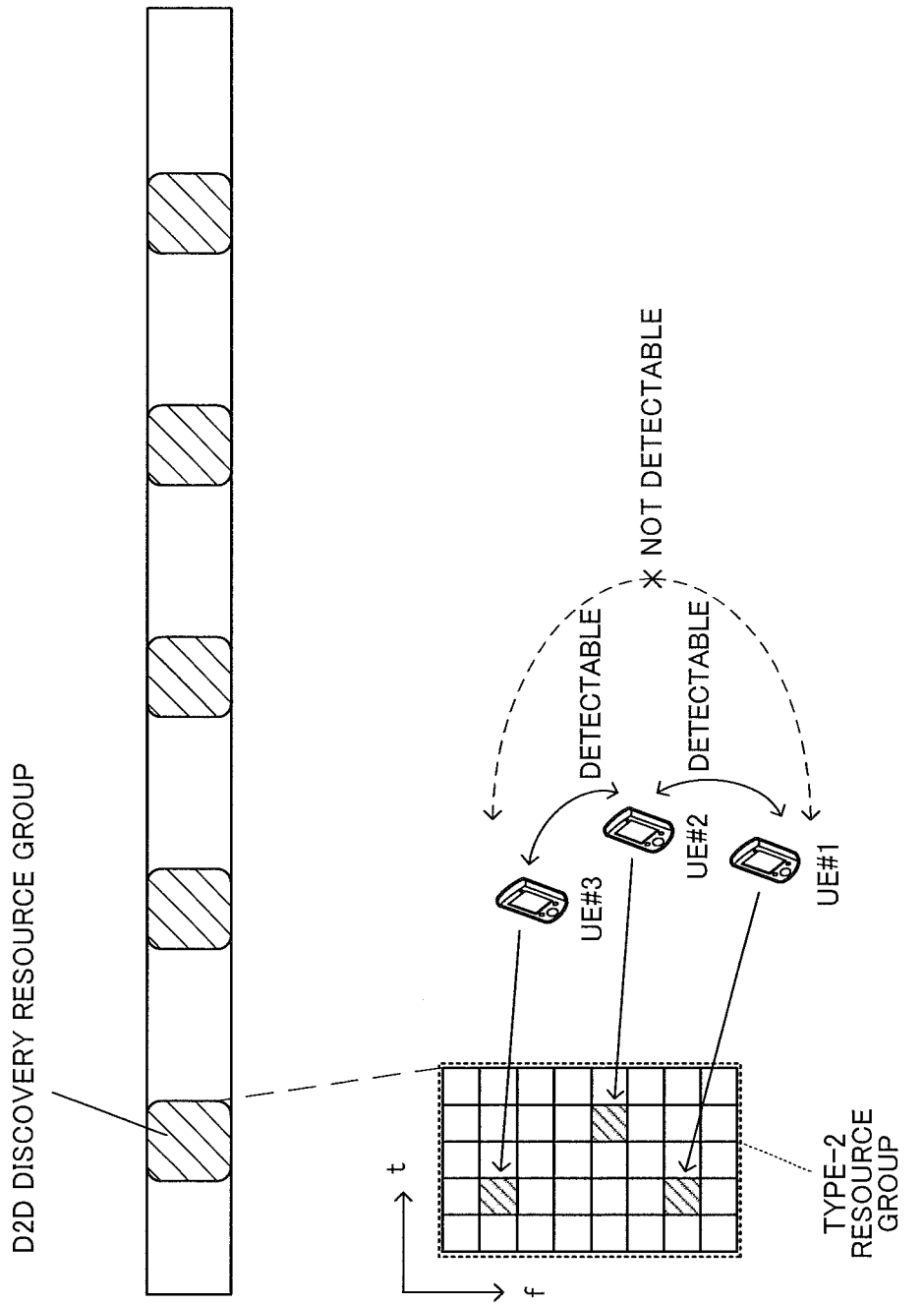
FIG. 2 is a diagram to explain whether or not detection is possible between user terminals in type 2 discovery.

In the example shown in FIG. 2, user terminal UE #1 can detect user terminal UE #2. As shown in FIG. 2, the transmission resources for user terminal UE #1 and UE #2 for transmitting discovery signals are present on different time axes. In this case, user terminal UE #1 can receive the discovery signal transmitted from user terminal UE #2. Similarly, user terminals UE #2 and UE #3 can detect each other.

On the other hand, in the example shown in FIG. 2, user terminal UE #1 is unable to detect user terminal UE #3. As shown in FIG. 2, the transmission resources for user terminal UE #1 and UE #3 for transmitting discovery signals are present on the same time axis. In this case, due to the limitation of half duplex, user terminal UE #1 is unable to receive the discovery signal transmitted from user terminal #3.

Unless the relative locations of transmission resources which each user terminal uses to transmit discovery signals are changed in every D2D discovery resource group that is allocated periodically, a problem arises that, due to the limitation of half-duplex, a given user terminal stays being unable to detect certain user terminals.

By contrast with this, if the network changes and reports the resource allocation for each user terminal in every period, it is possible to change the relative locations of transmission resources. However, this method increases signaling and therefore is not efficient.

The present inventors have found out, when type 2 discovery of D2D is carried out, using transmission resource locations specified by the network in the D2D discovery resource group in the first period, and, in the D2D discovery resource groups of subsequent periods, changing the transmission resource locations for use in accordance with predetermined rules. That is, transmission resources are hopped per period, in order to solve the problem with half duplex.

Now, the method of determining resources for transmitting discovery signals in type 2 discovery of D2D will be described in detail below.

FIRST EXAMPLE

A method will be described here, with a first example, where, in type 2 discovery of D2D, the transmission resource locations which each user terminal uses to transmit discovery signal are changed according to "predetermined rules." These "predetermined rules" will be hereinafter referred to simply as "pre-rules."

Figure 3:
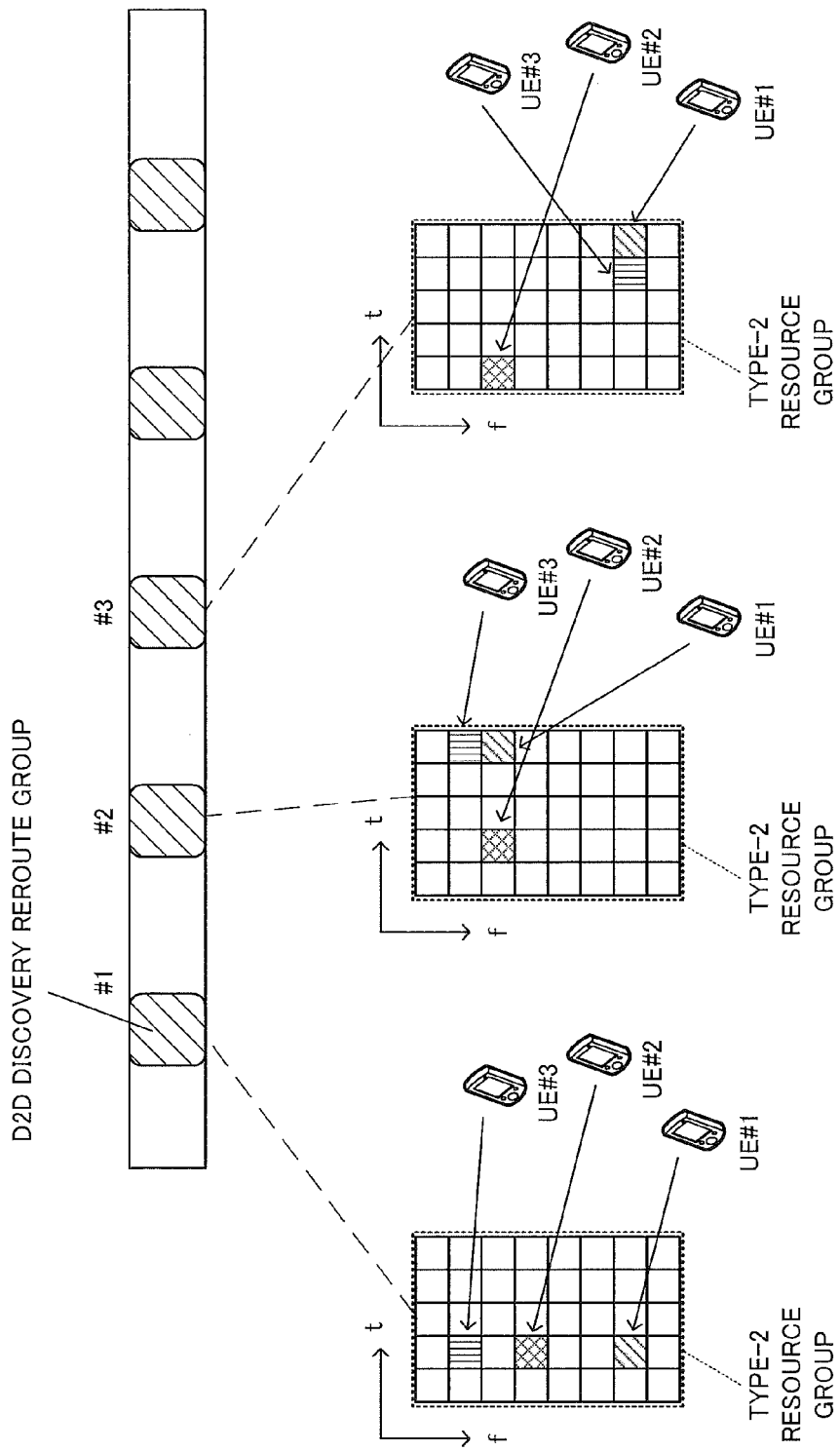
FIG. 3 is a diagram to show changes of resource locations for use for transmitting discovery signals, in a periodic D2D discovery resource group, according to a first example.

FIG. 3 is a diagram to show changes of transmission resource locations for use for transmitting discovery signals in a periodic D2D discovery resource group. The network reports the resource locations for transmitting discovery signals, to type 2 UEs, separately, only at timings where the D2D discovery group is broadcast semi-statically. This reporting is carried out by using, for example, SIB (System Information Block) signaling, RRC (Radio Resource Control) signaling, a broadcast channel (PBCH: Physical Broadcast Channel) and so on.

In this case, the network may report pre-rules to the user terminals. Also, the user terminals may use pre-rules that are stipulated as common specifications of D2D discovery functions.

Each user terminal uses the transmission resource that is specified by the network, only in the D2D discovery resource group of the first period (in FIG. 3, D2D discovery resource group #1).

In the D2D discovery resource groups of subsequent periods (in FIG. 3, D2D discovery resource groups #2 and #3), each user terminal uses transmission resources that are changed in accordance with pre-rules to transmit discovery signals.

In the example shown in FIG. 3, in the first period, in which D2D discovery resource group #1 is used, transmission resources on the same time axis are allocated to user terminal UE #1 to user terminal UE #3. Consequently, user terminal UE #1 to user terminal UE #3 transmit discovery signals at the same timing. Due to the limitation of half-duplex, each of user terminal UE #1 to user terminal UE #3 is unable to receive while transmission is in progress, and therefore is unable to receive the discovery signals transmitted from user terminals other than the subject terminal. Consequently, in the first period shown in FIG. 3, user terminal UE #1 to user terminal UE #3 cannot detect each other.

In the period in which D2D discovery resource group #2 is used, user terminal UE #1 to user terminal UE #3 change the discovery signal transmission resource locations from those of the first period, based on pre-rules.

In the period in which D2D discovery resource group #2 is used, user terminal UE #1 transmits the discovery signal at a different timing from that of user terminal UE #2, and therefore is able to receive the discovery signal transmitted from user terminal UE #2. Consequently, in the period in which D2D discovery resource group #2 is used, user terminal UE #1 can detect user terminal UE #2.

Meanwhile, in the period in which D2D discovery resource group #2 is used, user terminal UE #1 transmits the discovery signal at the same timing with user terminal UE #3, and therefore is unable to receive the discovery signal transmitted from user terminal UE #3. Consequently, in the period in which D2D discovery resource group #2 is used, user terminal UE #1 is unable to detect user terminal UE #3.

In the period in which D2D discovery resource group #2 is used, user terminal UE #2 can detect user terminal UE #1 and user terminal UE #3 that transmit discovery signals at different timings. In period in which D2D discovery resource group #2 is used, user terminal UE #3 can user terminal UE #2, but cannot detect user terminal UE #1.

In the period in which D2D discovery resource group #3 is used, user terminal UE #1 to user terminal UE #3 change the discovery signal transmission resource locations from the previous period, according to pre-rules. In the period in which D2D discovery resource group #3 is used, user terminal UE #1 and user terminal UE #3 transmit discovery signals at different timings, and therefore can detect each other.

In the example shown in FIG. 3, in the three periods in which D2D discovery resource groups #1 to #3 are used, a given user terminal that carries out D2D discovery is enabled to detect all of the other user terminals.

In this way, in type 2 discovery of D2D, each user terminal changes the transmission resource location for use for transmitting the discovery signal, on a per period basis, according to pre-rules, so that even user terminals, to which transmission resources are allocated at the same timing in a given period, are allocated transmission resources at different timings in another period, and therefore can detect each other.

SECOND EXAMPLE

With a second example, the "pre-rules" for use in type 2 discovery of D2D will be described in detail.

In the example shown in FIG. 3, it takes a given user terminal that carries out type 2 discovery of D2D three periods to be able to detect all of the other user terminals. In type 2 discovery of D2D, the periods it takes a given user terminal to be able to detect all of the other user terminals is determined depending on the "pre-rules" for changing the discovery signal transmission resource locations.

In type 2 discovery of D2D, in order to allow a given user terminal to detect all of the other user terminals in a certain period, this given user terminal has only to transmit the discovery signal to all the other user terminals, at least once, at different timings, within this period. It is preferable to employ pre-rules that minimize this period.

FIG. 4 provides diagrams to show a case where, when a resource group of a given size is configured as the type 2 resource group, a given user terminal detects all the other user terminals. To be more specific, an example will be described here where, as shown in FIG. 4, among the index numbers assigned to the resource blocks constituting the type 2 resource group, the user terminal to which the "first" resource is allocated detects the user terminals to which the "second" to "fortieth" resources are allocated.

Figure 4C:
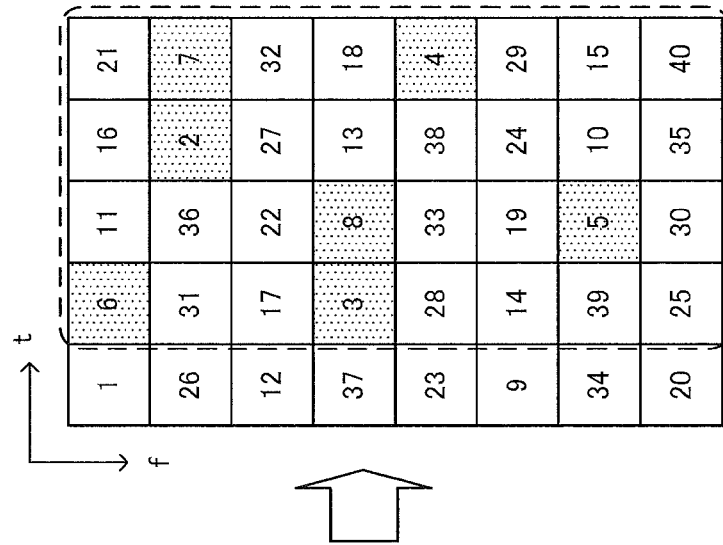
FIG. 4 provides diagrams to show an example in which a given user terminal detects all of the other user terminals in a type 2 resource group, according to a second example.
Figure 4B:
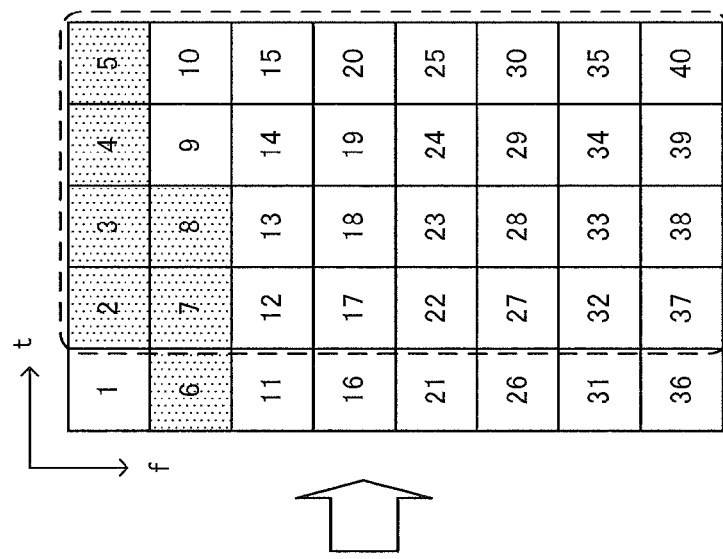
Figure 4A:
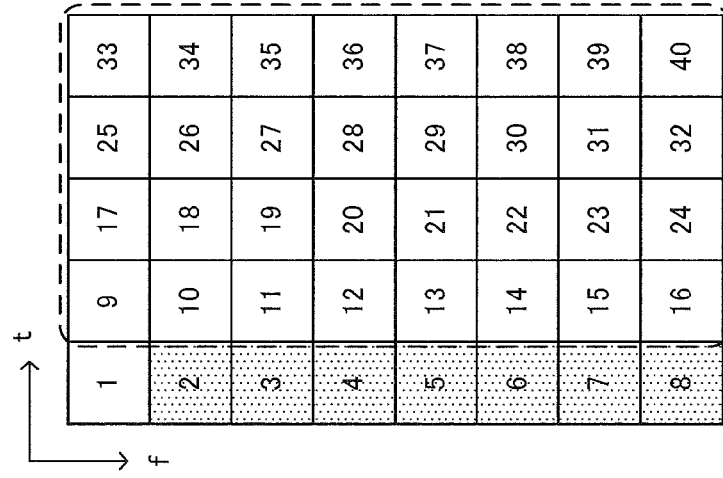

FIG. 4A is a diagram to show resource allocation in the first period of type 2 discovery of D2D. In this case, the user terminal allocated the "first" resource can detect each of the user terminals to which the "ninth" to "fortieth" resources are allocated and which transmit discovery signals at different timings from that of the subject terminal. However, the user terminal to which the "first" resource is allocated cannot detect the user terminals to which the "second" to "eighth" resources are allocated and which transmit discovery signals at the same timing with the subject terminal.

FIG. 4B is a diagram to show the resource allocation in the next period following FIG. 4A. The resource locations have been changed from the resource allocation of FIG. 4A, specified by the network, according to pre-rules. In this case, the user terminal to which the "first" resource is allocated can detect the user terminals to which the "second" to "fifth," the "seventh" and the "eighth" resource are newly allocated. However, the user terminal allocated the "first" resource still cannot detect the user terminal allocated the "sixth" resource.

FIG. 4C is a diagram show the resource allocation in the next period following FIG. 4B. The resource locations have been changed from the resource allocation of FIG. 4B, according to pre-rules. In this case, the user terminal to which the "first" resource is allocated can detect the user terminal to which the "sixth" resource is newly allocated.

As shown in FIG. 4, user terminals, to which resources are allocated to transmit discovery signals at the same timing, change the resource locations to transmit discovery signals at different timings in the next period, and therefore can detect all of the other user terminals in fewer periods.

Following this, the pre-rules, by which user terminals where the transmission resources specified by the network assume the same timing use transmission resources of different timings in the next period, will be described in detail. Such pre-rule can be implemented by switching the order of the time direction and the frequency direction in resource allocation.

FIG. 5 is a diagram to show an example of applying pre-rules for switching the order of the time direction and the frequency direction in resource allocation. FIG. 5A is a diagram to show the resource allocation in the first period in type 2 discovery of D2D. In FIG. 5A, from the upper left resource block on, index numbers 1 to 40 are assigned to each resource block, in order, in the frequency direction.

FIG. 5B shows the resource allocation in the next period following FIG. 5A. In FIG. 5B, resources are allocated by switching the frequency direction (column direction) and the time direction (row direction) in FIG. 5A. To be more specific, in FIG. 5A, the index numbers that are aligned in the frequency direction (column direction) from the upper left resource block on are re-arranged and allocated in the time direction (row direction) from the upper left resource block. That is, in FIG. 5B, from the upper left resource block on, index numbers 1 to 40 are assigned to each resource block, in order, in the time direction (row direction).

FIG. 5C is a diagram to show the resource allocation in the next period following FIG. 5B. In FIG. 5C, resources are allocated by switching the frequency direction (column direction) and the time direction (row direction) in FIG. 5B. To be more specific, in FIG. 5B, the index numbers that are aligned in the frequency direction (column direction) from the upper left resource block on are re-arranged and allocated in the time direction (row direction) from the upper left resource block. That is, the index numbers {1, 6, 11, 16, 21, . . . } that are aligned in the frequency direction (column direction) from the upper left resource block on in FIG. 5B are, in FIG. 5C, assigned to each resource block, in order, in the time direction (row direction), from the upper left resource block.

As shown in FIG. 5A, when index numbers are first assigned in the frequency direction, in order, from the upper left resource block, the N-th resource, which can be defined by following equation 1, is allocated to a user terminal.

$$N = f + (t-1)*F, \quad 1 \leq f \leq F, \quad 1 \leq t \leq T$$ (Equation 1)

where F is the number of resource blocks in the frequency direction, and T is the number of resource blocks in the time direction.

According to pre-rules, the user terminal to which the N-th resource is allocated will, in the next period, be allocated the N'-th resource, which can be defined by the following equation 2:

$$N'=f'+(t'-1)*F,\ t'=[f+(t-1)*F-1\ \mathrm{mod}\ T]+1,\ f'=\mathrm{floor}\{[f+(t-1)*F-1]/T\}+1 \quad \text{(Equation 2)}$$

where F is the number of resource blocks in the frequency direction, and T is the number of resource blocks in the time direction.

In the example shown in FIG. 5, the "twenty-first" resource is assigned to assume different locations on the time axis in the period shown in FIG. 5A and in the next period shown in FIG. 5B. Also, the "twenty-first" resource is assigned to assume different locations on the time axis in the period shown in FIG. 5B and in the next period shown in FIG. 5C.

In this way, in the above-described example of applying pre-rules, type 2 discovery of D2D is configured so that a transmission resource that is allocated to a user terminal assumes different timings in a given period and the following period. Meanwhile, with the above-described example, the locations of transmission resources in the frequency direction are not a problem.

For example, in the examples shown in FIG. 5, the user terminals to which the "first" to "fortieth" resources are allocated have to use the same frequency resource every period, and therefore cannot provide a frequency diversity effect.

Figures 6A, 6B, 6C:
FIG. 6 provides diagrams to show resource allocation, in which the resource allocation shown in FIG. 5 is shifted in the frequency direction, according to the second example.

So, as shown in FIG. 6, it may be possible to switch the resource locations in the frequency direction (row direction) on a per period basis. The examples shown in FIG. 6 are resource allocation that is given by shifting the resource allocation shown in FIG. 5 in the frequency direction. That is, FIG. 6B shows resource allocation that applies a 1-shift to the resource allocation shown in FIG. 5B in the frequency direction (row direction). That is, FIG. 6C shows resource allocation that applies a 2-shift to the resource allocation shown in FIG. 6B in the frequency direction (row direction).

In the example shown in FIG. 6, even the user terminals that are allocated the "first" resource, the "fortieth" resource and so on use varying frequency resources in every period, and therefore can provide a frequency diversity effect.

This frequency shift operation may be implemented by reporting the amount of shift from the network, or by determining the amount of shift on the user terminal side based on cell ID of the connecting cell and so on.

THIRD EXAMPLE

A method of semi-statically adjusting the number of type 1 resources and type 2 resources in D2D discovery resources will be described with a third example.

When changing transmission resources based on pre-rules, user terminals need to share common pre-rules and type 2 resource size information. However, when a fixed type 2 resource size is used regardless of the number of connecting user terminals, the problem arises that type 2 resources not in use become a waste if there are few type 2 UEs, and therefore it is necessary to adjust the resource size and report resource size information on a semi-static basis.

As shown in FIG. 1, D2D discovery resources are formed by including a type 1 resource group and a type 2 resource group. Type 2 UEs that execute type 2 discovery require UE-specific D2D resource allocation, and therefore the mode of connection between the user terminals and the network needs to be RRC connected mode (RRC_CONNECTED).

On the other hand, as for type 1 UEs that execute type 1 discovery, the mode of connection between the user terminals and the network may be RRC idle mode (RRC_IDLE) if the type 1 resource group is broadcast.

Type 2 discovery is free of collisions and more efficient than type 1 discovery, so that it is preferable to allocate type 2 resources as much as possible to user terminals in RRC connected mode. However, if the number of user terminals in connected mode is greater or lower than the number of resources, the number of resources may be adjusted.

If the number of type 2 resources is greater than the number of user terminals in connected mode, there must be resources in the type 2 resource group that are not allocated for use for transmitting the user terminals' discovery signals. It is inefficient to have type 2 resources that are not even allocated, and, in this case, it is effective to reduce the number of type 2 resources and increase the number of type 1 resources. As for type 2 resources, if resources are allocated so that there are at least two or more resources in the time direction, in the order of the initial state shown in FIG. 4A, it is possible to provide substantially the same number of time resources and frequency resources so that none will remain unused.

When the number of type 2 resources is smaller than the number of user terminals in connected mode, user terminals to exceed the number of resources may be made type 1 UEs, without specifying type 2 resource for these user terminals, until the number of type 1 and type 2 resources are next determined, broadcast and ready to change.

FOURTH EXAMPLE

A method of preventing type 2 resource collisions in a synchronous network will be described with a fourth example.

The allocation of type 2 resources in D2D discovery is managed on a per radio base station (eNB) basis. In a synchronous network, it is possible to prevent collisions of resources that are in use, by exchanging information about the type 2 resources that are allocated, between radio base stations.

Figure 7:
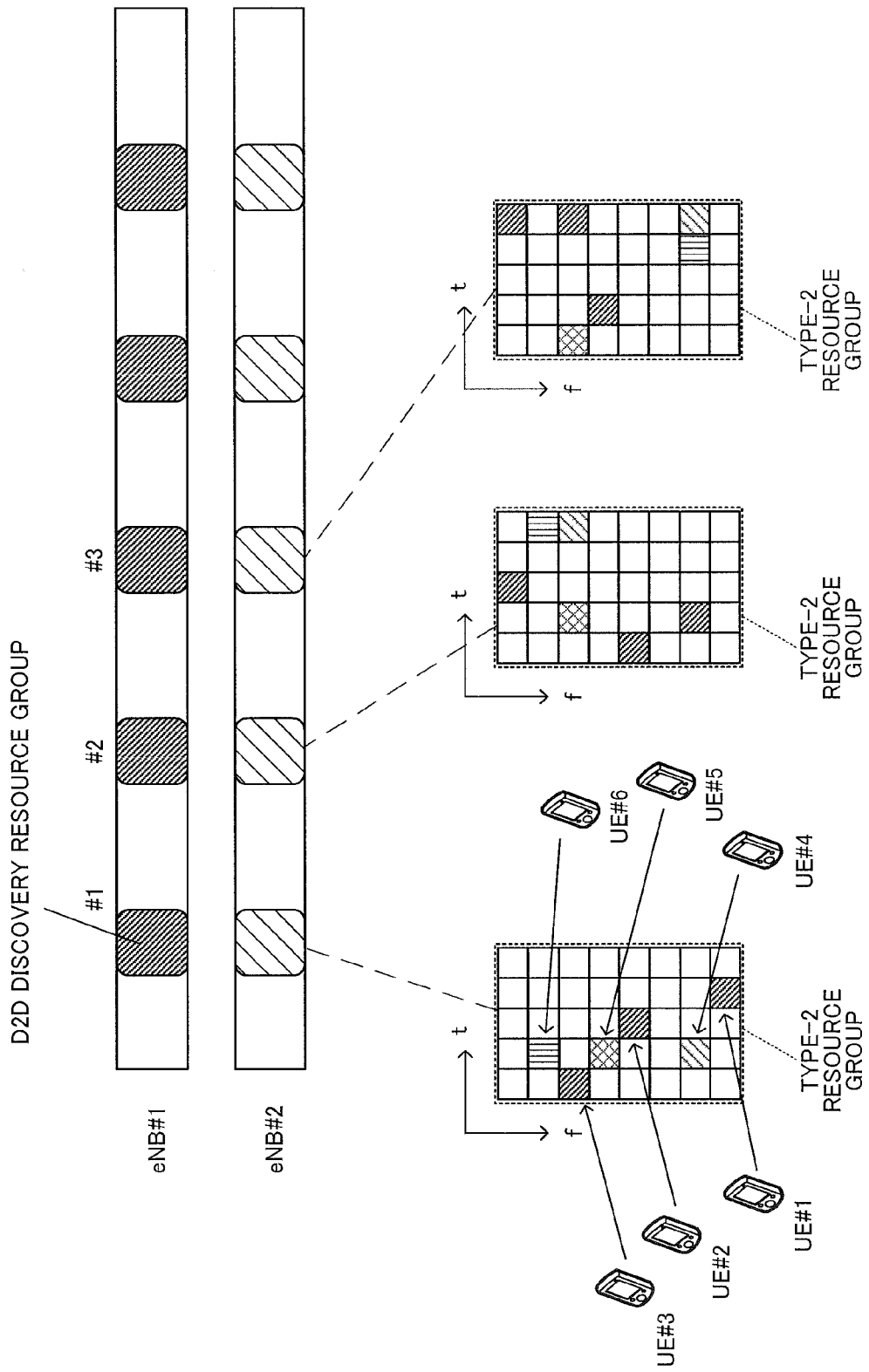
FIG. 7 is a diagram to show an example of type 2 resource allocation by radio base stations eNB #1 and eNB #2 in a synchronous network, according to a fourth example.

FIG. 7 is a diagram to show an example of type 2 resource allocation by radio base stations eNB #1 and eNB #2 in a synchronous network. The radio base stations each report the resource locations for transmitting discovery signals separately, to type 2 UEs. If radio base stations eNB #1 and eNB #2 employ common pre-rules, it is only necessary to exchange the information for the initial allocation for the D2D discovery resource group in the first period, between radio base stations eNB #1 and eNB #2.

To be more specific, radio base station eNB #1 has only to report, to radio base station eNB #2 that is nearby, the type 2 resource index that was used in initial allocation, and type 2 resource size information. The radio base station eNB #2 has only to report, to radio base station eNB #1 that is nearby, the type 2 resource index that was used in initial allocation, and type 2 resource size information.

In the D2D discovery resource groups in subsequent periods, each user terminal uses resource locations that are changed according to common pre-rules for transmitting discovery signals. If there was no collision in the stage of initial allocation, given that the resource locations are changed based on common rules, the resources that are used will not collide afterward.

In the example shown in FIG. 7, radio base station eNB #1 carries out the initial allocation of type 2 resources for user terminals UE #1 to user terminal UE #3 that are present in the cell formed by the subject base station. Radio base station eNB #2 carries out the initial allocation of type 2 resources for user terminal UE #4 to user terminal UE #6 that are present in the cell formed by the subject base station.

Radio base station eNB #1 reports, to radio base station eNB #2 that is nearby, the type 2 resource index that was used in initial allocation, and type 2 resource size information. Radio base station eNB #2 reports, to radio base station eNB #1 that is nearby, the type 2 resource index that was used in initial allocation, and type 2 resource size information. Also, radio base stations eNB #1 and eNB #2 may report the common pre-rules to each user terminal. Still, the user terminals may employ the pre-rules that are stipulated in D2D discovery specifications.

If the exchange of information about the initial allocation of type 2 resources between the radio base stations makes it clear that a collision occurred, one of the radio base stations has only to re-execute the initial allocation of type 2 resource, so that collisions will not be produced.

Alternatively, the timing of initial allocation and reporting initial allocation information to nearby radio base stations may be shifted between the radio base stations, so that the radio base station to determine new allocation may determine the initial allocation of type 2 resource to avoid collisions, based on the other radio base station's initial allocation information, which is already reported by then.

Alternatively, it is also possible to configure priorities on a per radio base station basis and report these priorities with initial allocation information. The priorities may be determined based on the degree of congestion. If it is found out that a collision occurred between the radio base stations in the initial allocation of type 2 resources, it is possible to avoid collisions by prioritizing the allocation information of the radio base station of the higher priority.

In the first period, all the user terminals transmit discovery signals by using initial resources that are allocated from the radio base stations. In subsequent periods, all the user terminals switch the locations of the resources for transmitting discovery signals, per period, according to common pre-rules. Even if initial resources are allocated from varying radio base stations, unlike FIG. 7, the resources do not collide because common pre-rules are applied.

FIFTH EXAMPLE

The time or frequency shift, which is applied in addition to "pre-rules," will be described in detail with a fifth example.

Figure 13:
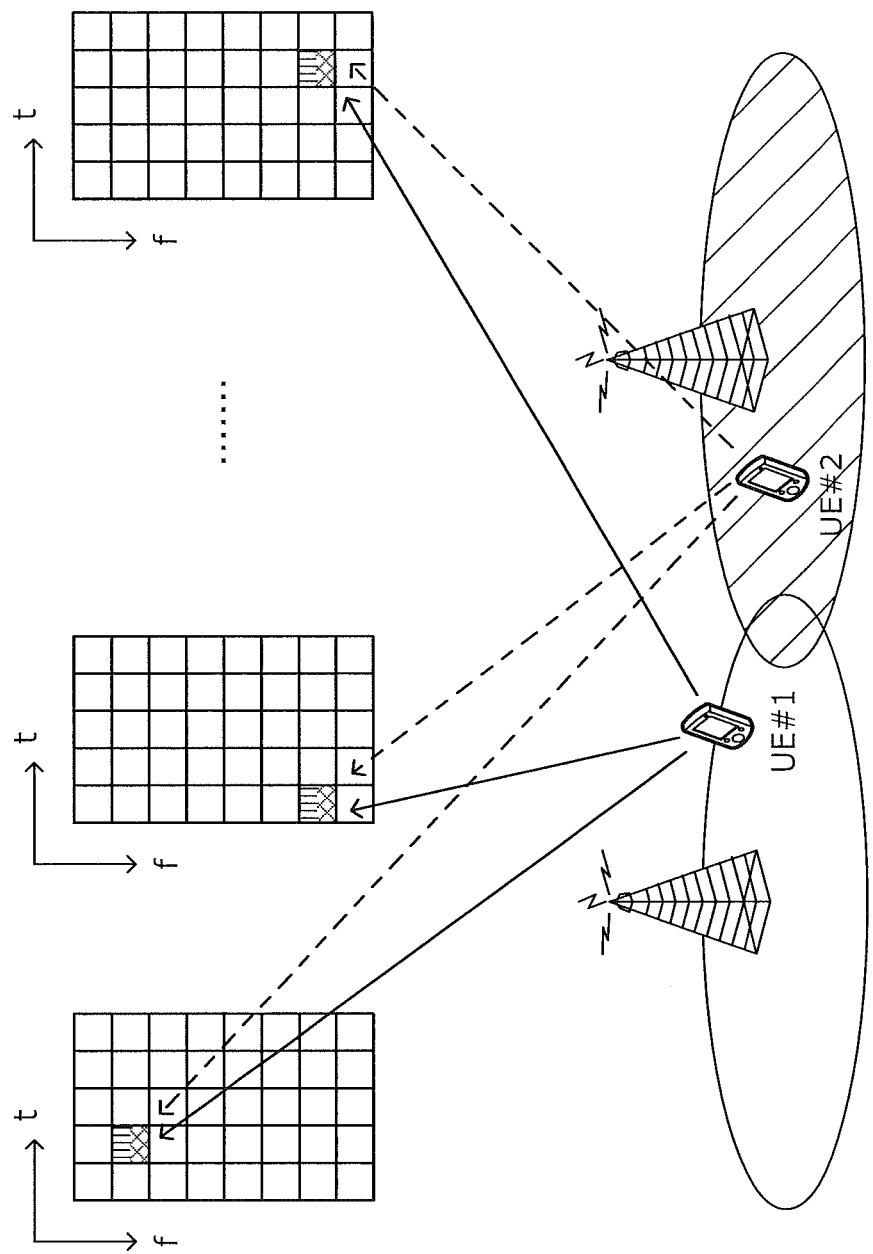
FIG. 13 is a diagram to explain initial resource allocation to user terminals between varying cells, according to a fifth example.

As shown in FIG. 13, between varying cells, initial resource allocation for user terminals UE is carried out separately. Consequently, there is a possibility that user terminals UE that serve varying cells are assigned together to the same time-frequency resource. In the example shown in FIG. 13, the same time-frequency resource is allocated as the initial resource to user terminals UE that serve varying cells #1 and UE #2.

In this case, if a hopping pattern that is common to all cells and all user terminals is used, collisions of transmission resources will keep occurring, on a constant basis, between these user terminals UE. In the example shown in FIG. 13, there is a collision of transmission resources between user terminal UE #1 and UE #2, in every period. In this case, user terminal UE #1 and UE #2 are unable to discover one another, and, in addition, there is a problem that nearby user terminals cannot discover these user terminals UE #1 and UE #2 either.

By contrast with this, if cell-specific shift patterns are employed in addition to the pre-rule of hopping shown with the above second example—that is, switching the order of the time direction and the frequency direction in resource allocation—collisions can be avoided. The shift patterns may apply shift either in the time direction or in the frequency direction.

The user terminals employ cell-specific shift patterns by using reports from the cells, PCIDs (Physical Cell IDs) and so on.

In the event reports are sent from the cells, each base station has only to report the shift pattern together when broadcasting type 2 resource pool information (D2D discovery resource group) to the D2D UEs in the subject cell. Which of shift in the time direction and shift in the frequency direction is used for the shift pattern may be reported together at this time, or may be fixed in advance.

When PCIDs and so on are used, a user terminal determines the shift pattern by using the PCID, VCID (Virtual Cell ID), or, alternatively, TPID (Transmission Point ID) for the Rel. 12 DRS (Discovery Reference Signal).

If which of shift in the time direction and shift in the frequency direction is used is determined in advance, the user terminal uses the value X of either the size in the time direction or the size in the frequency direction, in the type 2 resource pool information for the subject cell that is broadcast, and uses mod (504, X) as the amount of shift.

If which of shift in the time direction and shift in the frequency direction is used is not determined in advance, the user terminal uses the value X' of the greater one of the size in the time direction and the size in the frequency direction, in the type 2 resource pool information for the subject cell that is broadcast, and uses mod (504, X') as the amount of shift. That is, shift in the direction to correspond to the value of X' is used for the shift pattern.

After the user terminal transmits the discovery signal in the resource location initially allocated from the base station, in subsequent periods, the user terminal transmits the discovery signal in resource locations that are determined by switching the order of time-frequency in accordance with pre-rules and by applying the above shift, based on the resource location in the previous period.

Assume that the resource that is specified by the base station upon initial allocation is (f,t). In this case, the initially allocated resource index N in the resource pool can be represented by above equation 1. According to pre-rules, the user terminal that is allocated the N-th resource will use the N'-th resource (f', t'), which is represented by above equation 2, in the next period.

When frequency shift is applied in addition to pre-rules, the N'-th resource (f', t') can be represented by following equation 3:

$$N'=f'+(t'-1)*F, \; t'=[f+(t-1)*F-1 \bmod T]+1, \; f'=\text{floor}\{[f+(t-1)*F-1]/T\}+1+f\_shift \quad \text{(Equation 3)}$$

where, for f_shift, the value that is specified by RRC is used, and if no value is specified, mod (PCID, F) is used.

When time shift is employed in addition to pre-rules, the N'-th resource (f', t') can be represented by following equation 4:

$$N'=f'+(t'-1)*F, \; t'=[f+(t-1)*F-1 \bmod T]+1+t\_shift, \; f'=\text{floor}\{[f+(t-1)*F-1]/T\}+1 \quad \text{(Equation 4)}$$

where, for t_shift, the value that is specified by RRC is used, and if no value is specified, mod (PCID, T) is used.

FIG. 14 to FIG. 16 are diagrams to explain resource allocation where frequency shift is applied in addition to the pre-rule of hopping. FIG. 14 shows examples of 0-shifts, FIG. 15 shows examples of 1-shifts and FIG. 16 shows examples of 2-shifts.

Referring to the examples shown in FIG. 14, FIG. 14B shows the resource allocation in the next period following FIG. 14A. That is, in FIG. 14B, the resources are allocated by switching the frequency direction (column direction) and the time direction (row direction) of FIG. 14A. FIG. 14C shows the resource allocation in the next period following FIG. 14B. That is, in FIG. 14C, the resources are allocated by switching the frequency direction (column direction) and the time direction (row direction) of FIG. 14B.

Referring to the examples shown in FIG. 15, FIG. 15B shows the resource allocation in the next period following FIG. 15A. That is, in FIG. 15B, the resources are allocated by switching the frequency direction (column direction) and the time direction (row direction) in FIG. 15A, and by, furthermore, applying a 1-shift in the frequency direction. FIG. 15C shows the resource allocation in the next period following FIG. 15B. That is, in FIG. 15C, the resources are allocated by switching the frequency direction (column direction) and the time direction (row direction) in FIG. 15B, and by, furthermore, applying a 1-shift in the frequency direction.

Referring to the examples shown in FIG. 16, FIG. 16B shows the resource allocation in the next period following FIG. 16A. That is, in FIG. 16B, the resources are allocated by switching the frequency direction (column direction) and the time direction (row direction) in FIG. 16A, and by, furthermore, applying a 2-shift in the frequency direction. FIG. 16C shows the resource allocation in the next period following FIG. 16B. That is, in FIG. 16C, the resources are allocated by switching the frequency direction (column direction) and the time direction (row direction) in FIG. 16B, and by, furthermore, applying a 2-shift in the frequency direction.

For example, assume that the "first" resource is initially allocated to user terminals serving varying cells. In this case, a collision of resource occurs in the first period (see FIG. 14A, FIG. 15A and FIG. 16A).

However, by applying cell-specific shift patterns, in the next period, the location of the "first" resource becomes different among a user terminal serving under the 0-shift cell, a user terminal serving under the 1-shift cell and a user terminal serving under the 2-shift cell (see FIG. 14B, FIG. 15B and FIG. 16B). Consequently, collisions are avoided. The location of the "first" resource varies in the next period as well, thereby preventing collisions (see FIG. 14C, FIG. 15C and FIG. 16C).

FIG. 17 and FIG. 18 are diagrams to explain resource allocation where time shift is applied in addition to the pre-rule of hopping. FIG. 17 shows examples of 1-shifts, and FIG. 18 shows examples of 2-shifts. Note that the resource allocation shown in FIG. 14 is assumed in the event of 0-shifts.

Referring to the examples shown in FIG. 17, FIG. 17B shows the resource allocation in the next period following FIG. 17A. That is, in FIG. 17B, the resources are allocated by switching the frequency direction (column direction) and the time direction (row direction) in FIG. 17A, and by applying a 1-shift in the time direction. FIG. 17C shows the resource allocation in the next period following FIG. 17B. That is, in FIG. 17C, the resources are allocated by switching the frequency direction (column direction) and the time direction (row direction) in FIG. 17B, and by applying a 1-shift in the time direction.

Referring to the examples shown in FIG. 18, FIG. 18B shows the resource allocation in the next period following FIG. 18A. That is, in FIG. 18B, the resources are allocated by switching the frequency direction (column direction) and the time direction (row direction) in FIG. 18A, and by applying a 2-shift in the time direction. FIG. 18C shows the resource allocation in the next period following FIG. 18B. That is, in FIG. 18C, the resources are allocated by switching the frequency direction (column direction) and the time direction (row direction) in FIG. 18B, and by applying a 2-shift in the time direction.

For example, assume that the "first" resource is initially allocated to user terminals serving varying cells. In this case, a collision of resource occurs in the first period (see FIG. 14A, FIG. 17A and FIG. 18A).

However, by applying cell-specific shift patterns, in the next period, the location of the "first" resource becomes different among a user terminal serving under the 0-shift cell, a user terminal serving under the 1-shift cell and a user terminal serving under the 2-shift cell (see FIG. 14B, FIG. 17B and FIG. 18B). Consequently, collisions are avoided. The location of the "first" resource varies in the next period as well, thereby preventing collisions (see FIG. 14C, FIG. 17C and FIG. 18C).

Note that this is by no means limited to the "first" resource, and collisions can be avoided likewise in other resources as well. For example, the "sixth" resource in FIG. 14 to FIG. 18 derives the same result as in the above examples.

In this way, even when the same time-frequency resource is allocated to user terminals that serve varying cells as the initial resource, it is still possible to prevent continued collisions, by applying cell-specific shift patterns in addition to the pre-rule of hopping.

(Structure of Radio Communication System) Now, a structure of a radio communication system according to the present embodiment will be described below. In this radio communication system, the above radio communication methods according to the first example to the fourth example are employed.

Figure 8:
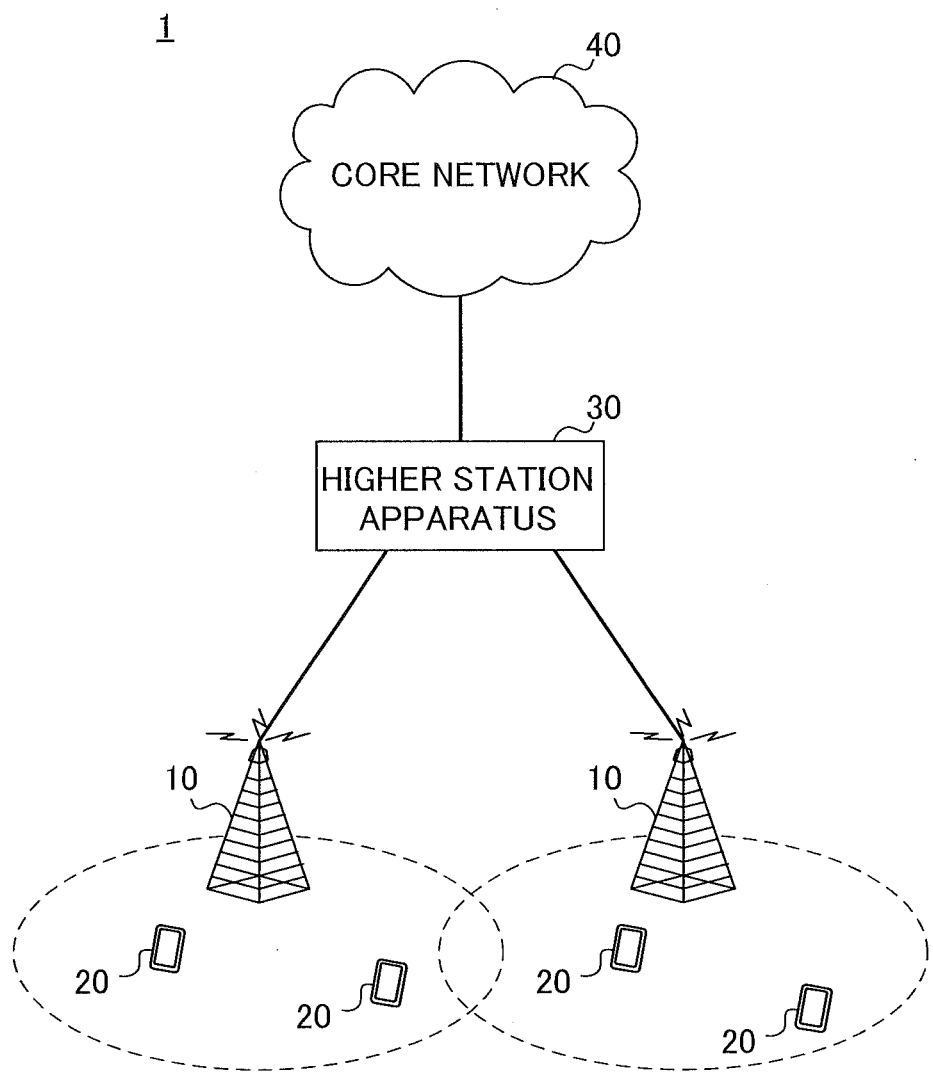
FIG. 8 is a schematic diagram to show an example of a radio communication system according to the present embodiment.

FIG. 8 is a schematic diagram to show an example of a radio communication system according to the present embodiment. As shown in FIG. 8, the radio communication system 1 includes a plurality of radio base stations 10, and a plurality of user terminals 20 that are present in cells formed by each radio base stations 10, and that can communicate with each radio base station 10. The radio base station 10 are each connected with a higher station apparatus 30, and connected with a core network 40 via the higher station apparatus 30.

The radio base stations 10 are radio base stations having predetermined coverages. That is, a radio base station 10 may be a macro base station having a relatively wide coverage (eNodeB, macro base station, aggregation node, transmission point, transmitting/receiving point), or may be a small base station having a local coverage (small base station, pico base station, femto base station, HeNB (Home eNodeB), RRH (Remote Radio Head), micro base station, transmission point, transmitting/receiving point).

The user terminals 20 are terminals to support various communication schemes such as LTE and LTE-A, and may not only be mobile communication terminals, but may also be stationary communication terminals as well. A user terminal 20 can communicate with other user terminals 20 via the radio base stations 10. Also, a user terminal 20 can directly communicate with other user terminals 20 (D2D) without involving the radio base stations 10.

The higher station apparatus 30 may be, for example, an access gateway apparatus, a radio network controller (RNC), a mobility management entity (MME) and so on, but is by no means limited to these.

Also, in the radio communication system 1, a downlink shared channel (PDSCH: Physical Downlink Shared Channel), which is used by each user terminal 20 on a shared basis, downlink control channels (PDCCH (Physical Downlink Control Channel) and EPDCCH (Enhanced Physical Downlink Control Channel)), a broadcast channel (PBCH) and so on are used as downlink channels. User data and higher layer control information and predetermined SIBs (System Information Blocks) are communicated by the PDSCH. Downlink control information (DCI) is communicated by the PDCCH and the EPDCCH.

Also, in the radio communication system 1, an uplink shared channel (PUSCH: Physical Uplink Shared Channel) that is used by each user terminal 20 on a shared basis, an uplink control channel (PUCCH: Physical Uplink Control Channel) and so on are used as uplink channels. User data and higher layer control information are communicated by the PUSCH.

In the radio communication system 1, discovery signals for allowing the user terminals 20 to detect each other are transmitted on the uplink.

Figure 9:
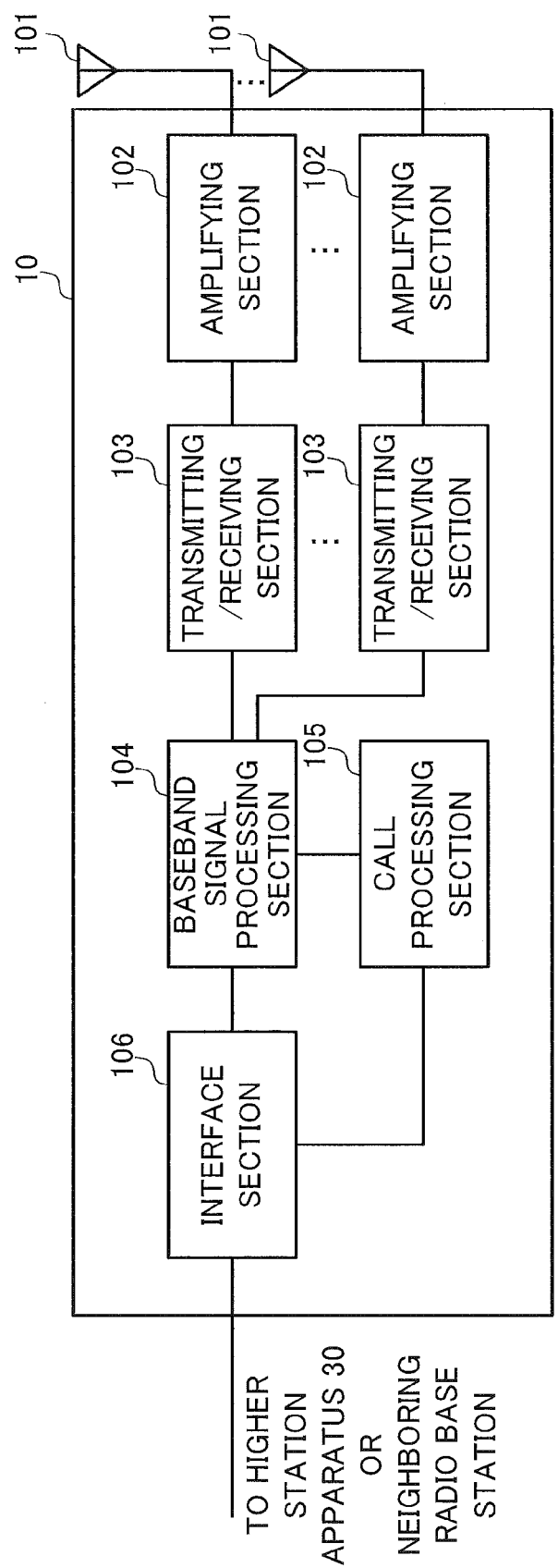
FIG. 9 is a diagram to explain an overall structure of a radio base station according to the present embodiment.

FIG. 9 is a diagram to show an overall structure of a radio base station 10 according to the present embodiment. The radio base station 10 has a plurality of transmitting/receiving antennas 101 for MIMO communication, amplifying sections 102, transmitting/receiving sections 103, a baseband signal processing section 104, a call processing section 105 and an interface section 106.

User data to be transmitted from the radio base station 10 to a user terminal 20 on the downlink is input from the higher station apparatus 30, into the baseband signal processing section 104, via the interface section 106

The baseband signal processing section 104 performs a PDCP (Packet Data Convergence Protocol) layer process, division and coupling of user data, RLC (Radio Link Control) layer transmission processes such as an RLC retransmission control transmission process, MAC (Medium Access Control) retransmission control, including, for example, an HARQ (Hybrid Automatic Repeat reQuest) transmission process, scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and are forwarded to each transmitting/receiving section 103.

Each transmitting/receiving section 103 converts the downlink signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, as for uplink signals, radio frequency signals that are received in the transmitting/receiving antennas 101 are each amplified in the amplifying sections 102, converted into the baseband signal through frequency conversion in each transmitting/receiving section 103, and input in the baseband signal processing section 104.

Each transmitting/receiving section 103 reports the D2D discovery resource group to each user terminal 20. Each transmitting/receiving section 103 transmits, to each user terminal 20, initial allocation location information of the resource for transmitting the discovery signal for use in D2D discovery. Each transmitting/receiving sections 103 reports pre-rules to each user terminal 20.

In the baseband signal processing section 104, the user data that is included in the input uplink signals is subjected to a fast Fourier transform (FFT) process, an inverse discrete Fourier transform (IDFT) process, error correction decoding, a MAC retransmission control receiving process and RLC layer and PDCP layer receiving processes, and the result is forwarded to the higher station apparatus 30 via the interface section 106. The call processing section 105 performs call processing such as setting up and releasing communication channels, manages the state of the radio base station 10 and manages the radio resources.

The interface section 106 transmits and receives signals to and from neighboring radio base stations (backhaul signaling) via an inter-base station interface (for example, optical fiber, X2 interface, etc.). Alternatively, the interface section 106 transmits and receives signals to and from the higher station apparatus 30 via a predetermined interface.

The interface section 106 transmits the type 2 resource indices that were used for each user terminal 20 upon initial allocation, and type 2 resource size information, with neighboring radio base stations.

Figure 10:
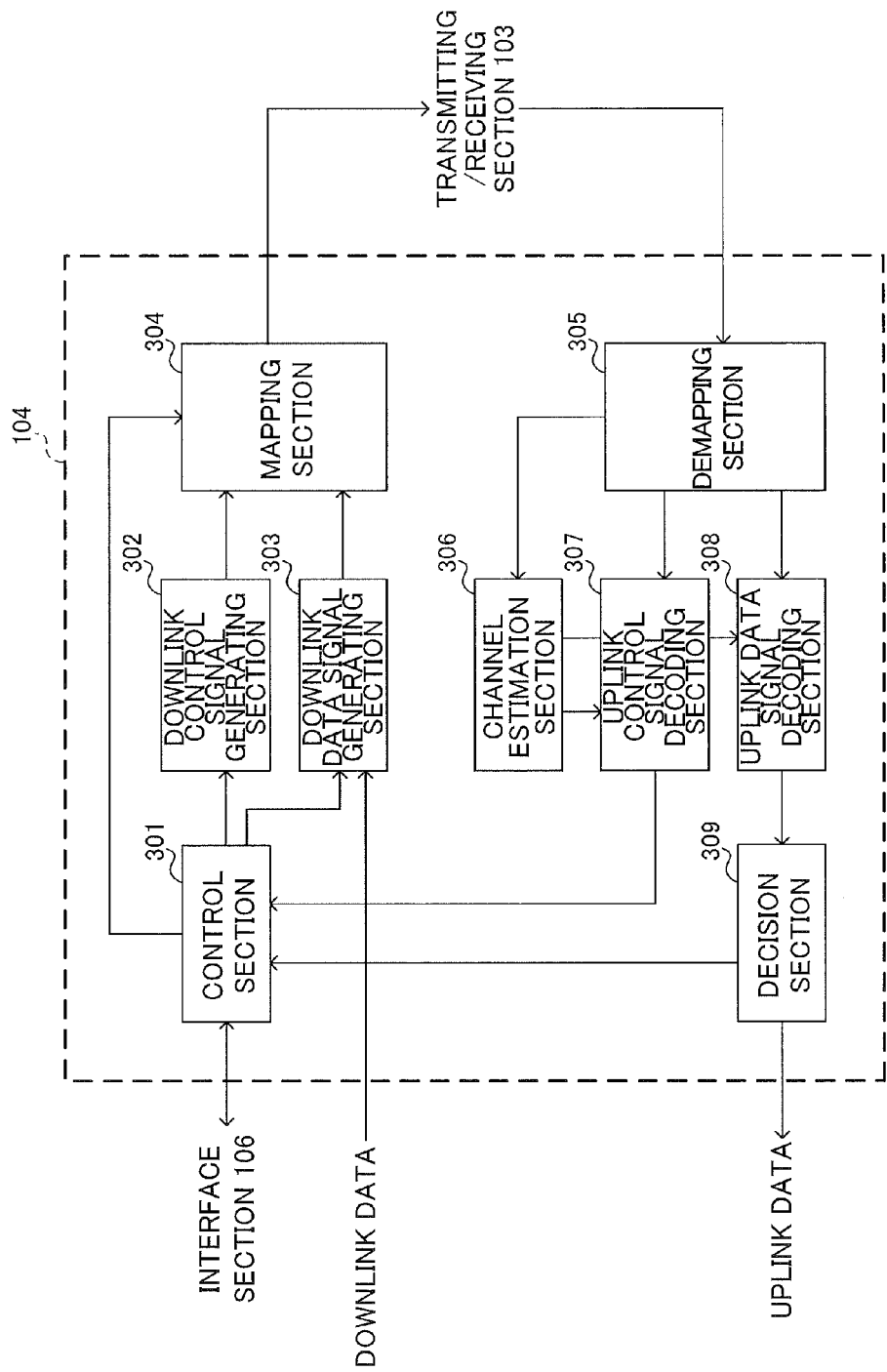
FIG. 10 is a diagram to explain a functional structure of a radio base station according to the present embodiment.

FIG. 10 is a diagram to show a principle functional structure of the baseband signal processing section 104 provided in the radio base station 10 according to the present embodiment. As shown in FIG. 10, the baseband signal processing section 104 provided in the radio base station 10 is comprised at least of a control section 301, a downlink control signal generating section 302, a downlink data signal generating section 303, a mapping section 304, a demapping section 305, a channel estimation section 306, an uplink control signal decoding section 307, an uplink data signal decoding section 308 and a decision section 309.

The control section 301 controls the scheduling of downlink user data that is communicated in the PDSCH, downlink control information that is transmitted in one or both of the PDCCH and the enhanced PDCCH (EPDCCH), downlink reference signals and so on. Also, the control section 301 also controls the scheduling of RA (Random Access) preambles that are communicated in the PRACH (Physical Random Access Channel), uplink data that is communicated in the PUSCH, uplink control information that is communicated in the PUCCH or the PUSCH and uplink reference signals (allocation control). Information regarding the allocation control of uplink signals (uplink control signals and uplink user data) is reported to the user terminals 20 by using downlink control signals (DCI).

The control section 301 controls the allocation of radio resources to the downlink signals and the uplink signals based on command information from the higher station apparatus 30, feedback information from each user terminal 20 and so on. That is, the control section 301 functions as a scheduler.

The control section 301 allocates D2D discovery resource groups to user the terminals semi-statically. The control section 301 allocates type 2 resources to type 2 UEs separately.

The downlink control signal generating section 302 generates downlink control signals that are determined to be allocated by the control section 301 (both or either one of the PDCCH signal and the EPDCCH signal). To be more specific, the downlink control signal generating section 302 generates a DL assignment, which reports downlink signal allocation information, and a UL grant, which reports uplink signal allocation information, based on commands from the control section 301.

The downlink data signal generating section 303 generates the downlink data signal (PDSCH signal) that is determined to be allocated to resources by the control section 301. The data signals that is generated in the downlink data signal generating section 303 is subjected to a coding process and a modulation process in a coding rate and a modulation scheme determined based on CSI (Channel State Information) from each user terminal 20 and so on.

The mapping section 304 controls the allocation of the downlink control signals generated in the downlink control signal generating section 302 and the downlink data signal generated in the downlink data signal generating section 303 to radio resources, based on commands from the control section 301.

The demapping section 305 demaps the uplink signals transmitted from the user terminals and separates the uplink signals. The channel estimation section 306 estimates channel states from the reference signals included in the received signals separated in the demapping section 305, and outputs the estimated channel states to the uplink control signal decoding section 307 and the uplink data signal decoding section 308.

The uplink control signal decoding section 307 decodes the feedback signals (delivery acknowledgement signals and so on) transmitted from the user terminals in uplink control channels (PRACH, PUCCH), and outputs the results to the control section 301. The uplink data signal decoding section 308 decodes the uplink data signals transmitted from the user terminals in the uplink shared channel (PUSCH), and outputs the results to the decision section 309. The decision section 309 makes retransmission control decisions (A/N (Acknowledgement/Negative acknowledgement) decisions) based on the decoding results in the uplink data signal decoding section 308, and outputs results to the control section 301.

Figure 11:
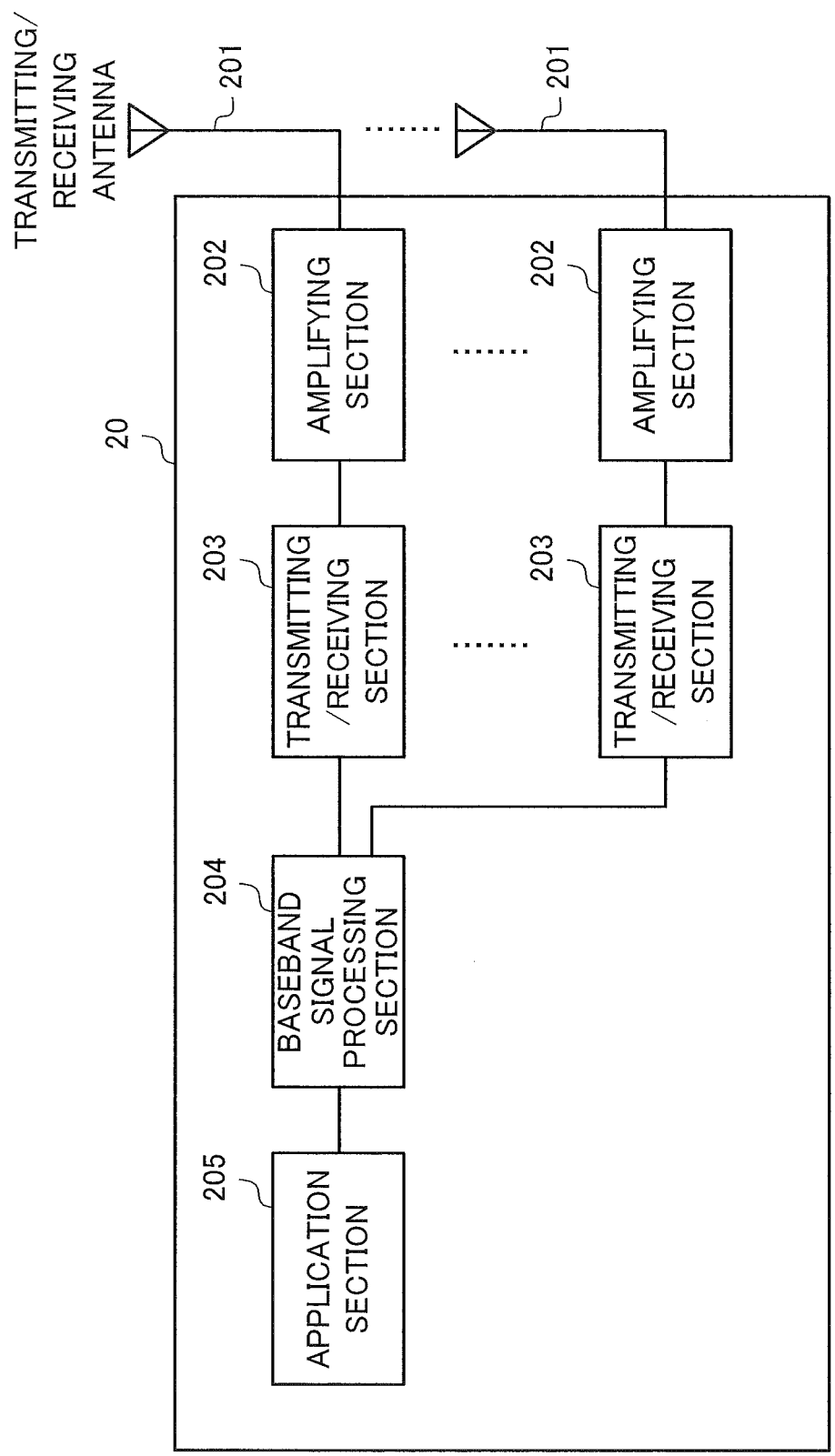
FIG. 11 is a diagram to explain an overall structure of a user terminal according to the present embodiment.

FIG. 11 is a diagram to show an overall structure of a user terminal 20 according to the present embodiment. As shown in FIG. 11, the user terminal 20 has a plurality of transmitting/receiving antennas 201 for MIMO communication, amplifying sections 202, transmitting/receiving sections (receiving sections) 203, a baseband signal processing section 204 and an application section 205.

As for downlink data, radio frequency signals that are received in a plurality of transmitting/receiving antennas 201 are each amplified in the amplifying sections 202, and subjected to frequency conversion and converted into the baseband signal in the transmitting/receiving sections 203. This baseband signal is subjected to an FFT process, error correction decoding, a retransmission control receiving process and so on, in the baseband signal processing section 204. In this downlink data, downlink user data is forwarded to the application section 205. The application section 205 performs processes related to higher layers above the physical layer and the MAC layer, and so on. Also, in the downlink data, broadcast information is also forwarded to the application section 205.

Meanwhile, uplink user data is input from the application section 205 into the baseband signal processing section 204. The baseband signal processing section 204 performs a retransmission control (HARQ) transmission process, channel coding, pre-coding, a DFT (Discrete Fourier Transform) process, an IFFT process and so on, and the result is forwarded to each transmitting/receiving section 203. The baseband signal that is output from the baseband signal processing section 204 is converted into a radio frequency band in the transmitting/receiving sections 203. After that, the amplifying sections 202 amplify the radio frequency signal having been subjected to frequency conversion, and transmit the result from the transmitting/receiving antennas 201.

The transmitting/receiving sections 203 receive, from the radio base stations 10, type 1/2 resource size information in the D2D discovery resource groups and initial allocation information of the resources for transmitting discovery signals for use in D2D discovery. The transmitting/receiving sections 203 allocate discovery signals for D2D discovery to the specified type 2 resources and transmit these signals. The transmitting/receiving sections 203 receives the discovery signals for D2D discovery transmitted from other user terminals 20.

Figure 12:
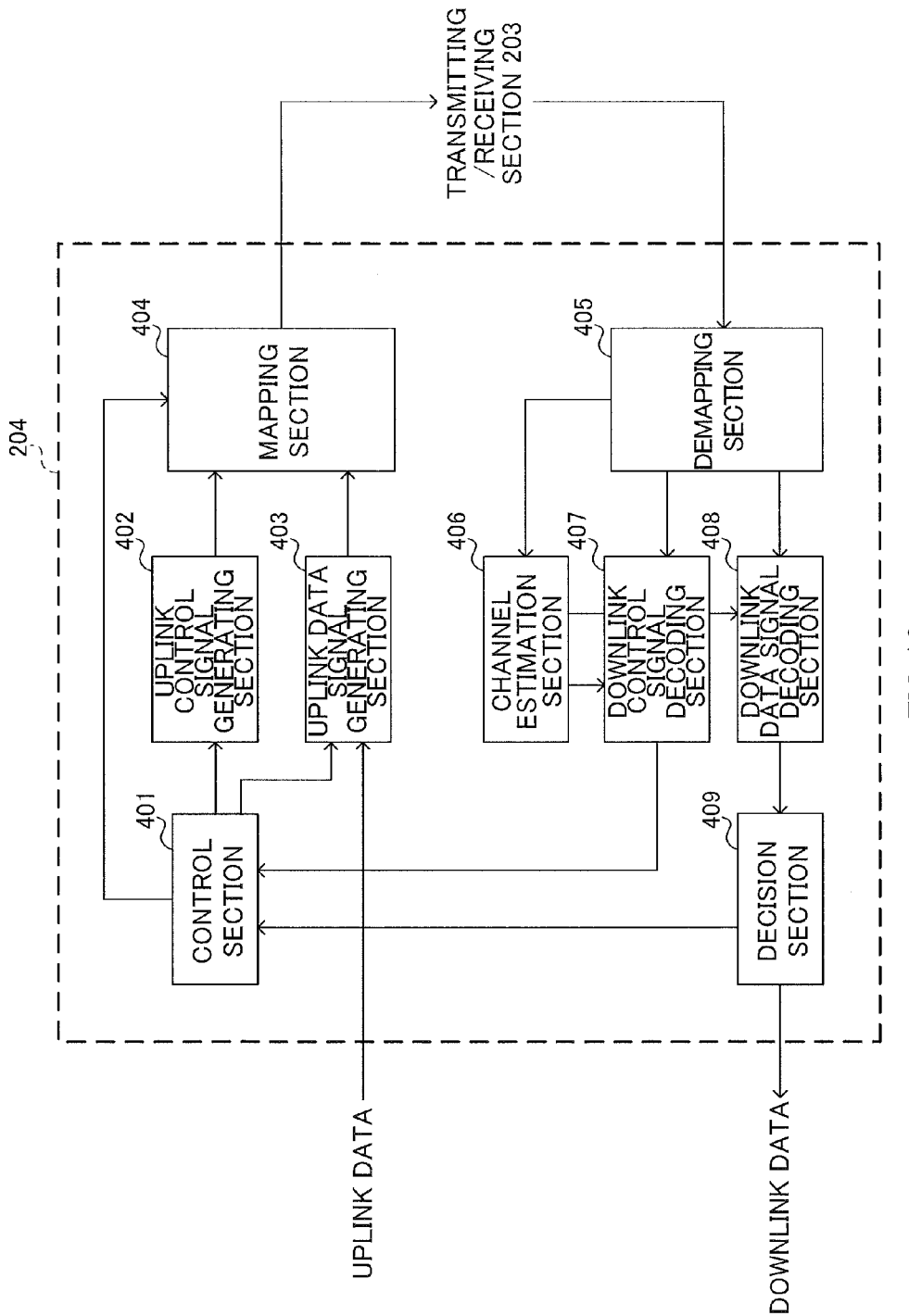
FIG. 12 is a diagram to explain a functional structure of a user terminal according to the present embodiment.

FIG. 12 is a diagram to show a principle functional structure of the baseband signal processing section 204 provided in a user terminal 20. As shown in FIG. 12, the baseband signal processing section 204 provided in the user terminal 20 is comprised at least of a control section 401, an uplink control signal generating section 402, an uplink data signal generating section 403, a mapping section 404, a demapping section 405, a channel estimation section 406, a downlink control signal decoding section 407, a downlink data signal decoding section 408 and a decision section 409.

The control section 401 controls the generation of uplink control signals (A/N signals and so on) and uplink data signals based on downlink control signals (PDCCH signals) transmitted from the radio base stations, retransmission control decisions in response to the PDSCH signals received, and so on. The downlink control signals received from the radio base stations are output from the downlink control signal decoding section 407, and the retransmission control decisions are output from the decision section 409.

The control section 401 changes the resource locations to transmit discovery signals, on a per period basis, according to pre-rules. To be more specific, where index numbers are assigned to individual resources that neighbor each other in two-dimensional directions, namely the frequency direction and the time direction, the control section 401 rearranges the index numbers aligned in the frequency direction, in the time direction, and assigns the rearranged numbers. Also, the control section 401 shifts the resources that are rearranged in accordance with pre-rules, in the frequency direction.

The uplink control signal generating section 402 generates uplink control signals (feedback signals such as delivery acknowledgement signals, channel state information (CSI) and so on) based on commands from the control section 401. The uplink data signal generating section 403 generates uplink data signals based on commands from the control section 401. Note that the control section 401 commands the uplink data signal generating section 403 to generate an uplink data signal when a UL grant is contained in a downlink control signal reported from the radio base station.

The mapping section 404 controls the allocation of the uplink control signals (delivery acknowledgment signals and so on) and the uplink data signals to radio resources (PUCCH and PUSCH) based on commands from the control section 401. The mapping section 404 controls the allocation of discovery signals for D2D discovery to resources in the type 2 resource groups based on commands from the control section 401.

The demapping section 405 demaps the downlink signals transmitted from the radio base stations 10 and separates the downlink signals. The channel estimation section 406 estimates channel states from the reference signals included in the received signals separated in the demapping section 406, and outputs the estimated channel states to the downlink control signal decoding section 407 and the downlink data signal decoding section 408.

The downlink control signal decoding section 407 decodes the downlink control signal (PDCCH signal) transmitted in the downlink control channel (PDCCH), and outputs the scheduling information (information about the allocation to uplink resources) to the control section 401. Also, if information related to the cells for feeding back delivery acknowledgment signals and information as to whether or not RF (Radio Frequency) tuning is applied are included in downlink control signals, these pieces of information are also output to the control section 401.

The downlink data signal decoding section 408 decodes the downlink data signals transmitted in the downlink shared channel (PDSCH), and outputs the result to the decision section 409. The decision section 409 makes retransmission control decisions (A/N decisions) based on the decoding results in the downlink data signal decoding section 408, and outputs the results to the control section 401.

The control section 401 detects other communicable user terminals 20 based on the discovery signals for D2D discovery transmitted from other user terminals 20.

The present invention is by no means limited to the above embodiment and can be implemented in various modifications. The sizes and shapes illustrated in the accompanying drawings in relationship to the above embodiment are by no means limiting, and may be changed as appropriate within the scope of optimizing the effects of the present invention. Besides, implementations with various appropriate changes may be possible without departing from the scope of the object of the present invention.

The disclosures of Japanese Patent Application No. 2013-226300, filed on Oct. 31, 2013, and Japanese Patent Application No. 2014-096046, filed on May 7, 2014, including the specifications, drawings and abstracts, are incorporated herein by reference in their entirety.

The invention claimed is:

1. A user terminal comprising:
a receiver that receives from a base station a radio signal indicating initial allocation location information of a resource for transmitting a discovery signal to discover another user terminal;
a processor that switches a location of the resource to transmit the discovery signal, per period, in accordance with a pre-rule; and
a transmitter that transmits the discovery signal based on the switched location of the resource,
wherein index numbers are assigned to individual resources that neighbor each other in two-dimensional directions including a frequency direction and a time direction, and
the transmitter transmits the discovery signal with one of the individual resources in which index numbers that are aligned in the frequency direction are rearranged into the time direction by the processor, per period, in accordance with the pre-rule.

2. The user terminal according to claim 1, wherein the processor shifts the resource that is rearranged in accordance with the pre-rule, into the frequency direction.

3. The user terminal according to claim 2, wherein the receiver receives information about an amount of shift simultaneously with the initial allocation location information.

4. The user terminal according to claim 1, wherein the processor shifts the resource that is rearranged in accordance with the pre-rule, into the time direction.

5. The user terminal according to claim 4, wherein shift in the time direction is cell-specific shift.

6. The user terminal according to claim 5, wherein the receiver receives information about an amount of shift simultaneously with the initial allocation location information.

7. The user terminal according to claim 4, wherein the receiver receives information about an amount of shift simultaneously with the initial allocation location information.

8. A radio communication method comprising:
receiving from a base station a radio signal indicating initial allocation location information of a resource for transmitting a discovery signal to discover another user terminal;
switching a location of the resource to transmit the discovery signal, per period, in accordance with a pre-rule; and
transmitting the discovery signal based on the switched location of the resource,
wherein index numbers are assigned to individual resources that neighbor each other in two-dimensional directions including a frequency direction and a time direction, and
the discovery signal is transmitted with one of the individual resources in which index numbers that are aligned in the frequency direction are rearranged into the time direction, per period, in accordance with the pre-rule.

* * * * *